May 23, 1950
H. I. ZAGOR
2,508,879
SWEEP VOLTAGE GENERATOR
Filed Nov. 27, 1944
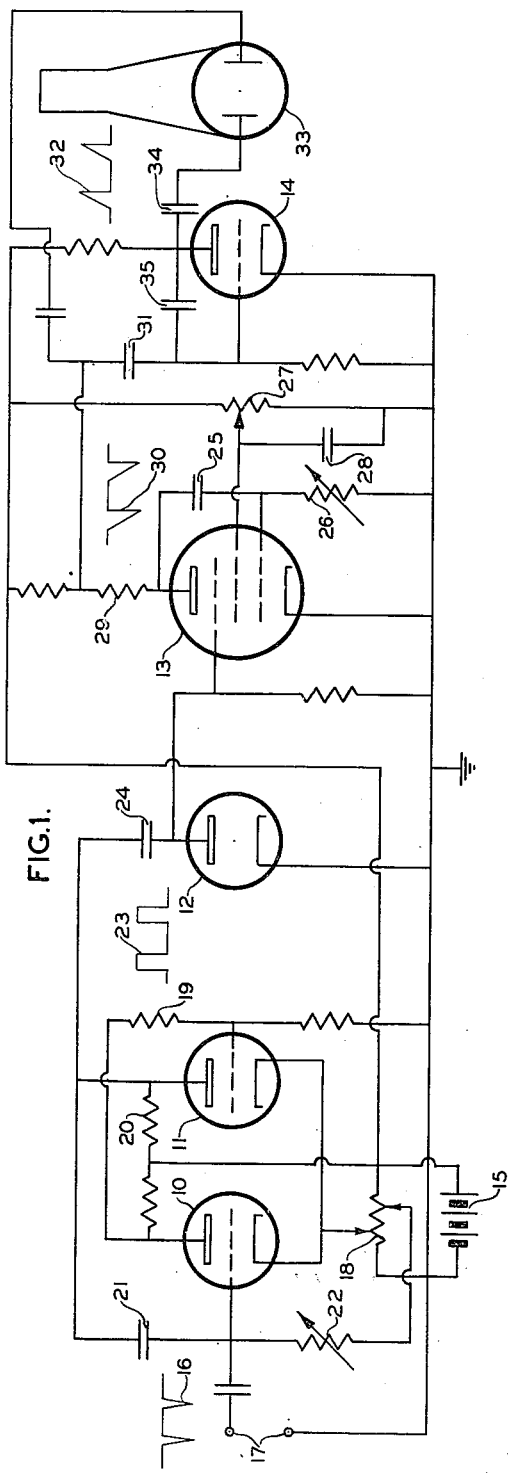
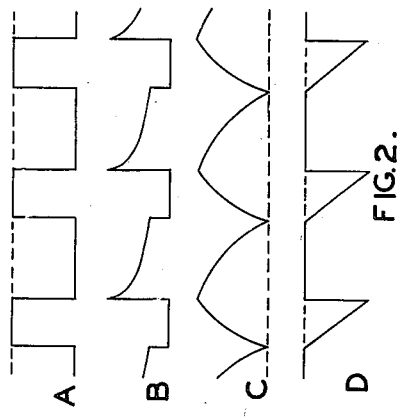
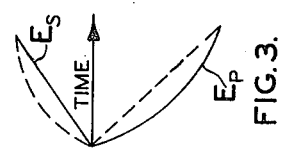
*INVENTOR.*
HERBERT I. ZAGOR
BY *William D. Hall*
ATTORNEY Patented May 23, 1950

2,508,879

UNITED STATES PATENT OFFICE 2,508,879

SWEEP VOLTAGE GENERATOR

Herbert I. Zagor, New York, N. Y.

Application November 27, 1944, Serial No. 565,387

2 Claims. (Cl. 250—27)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to arrangements for controlling a cathode ray tube and, more particularly, for deflecting the cathode ray electron beam across the screen in a definite time relation.

In the use of cathode ray tubes as oscilloscopes, it is required to cause the electron beam to be deflected during a certain period of time by an amount which varies linearly with time and then to return to its starting point as rapidly as possible. Circuits performing this function are commonly designated as sweep voltage generators.

Pulse echo systems for object detection and ranging ordinarily employ a cathode ray oscilloscope to indicate the received echo peaks. In one of such systems, an exploratory pulse of electromagnetic energy is radiated in space and is used simultaneously to trigger a sweep voltage generator, whereby at the instant of pulse radiation the generator commences to draw a base line across the cathode ray tube indicator. After various time intervals subsequent to the transmission of the pulses, which intervals are a function of the disposition of reflecting targets, echo pulses are received and applied to the cathode ray tube in a manner causing a deflection lateral to the base line. These echo deflections or "pips" as they are called, provide an index to the target site. By suitably calibrating the base line on the cathode ray tubes screen in terms of distance, the target position is made directly available.

In many systems of this character, gating circuits are employed in conjunction with the oscilloscope for the purpose of blanking out the oscilloscope display except for certain desired time segments in the reception periods between the transmissions of exploratory pulses. By this method, the display on the tube screen is limited to pre-selected areas of interest, thus deleting a considerable portion of distracting "grass" as well as echos of no significance. Gating circuits conventionally assume the form of square or rectangular wave generators the output of which is usually connected to the control electrode of the oscilloscope in a manner rendering the tube operative for a period of time equivalent to the width of the positive portion of the wave and inoperative for the relatively protracted negative portion thereof.

The primary object of the present invention is to provide a new and improved sweep voltage generator which is triggered by the rectangular wave output of a gating generator to form a saw tooth wave.

Another object of this invention is to provide a circuit of the above type yielding an output voltage whose form assumes a highly linear sawtooth pattern.

Briefly stated, the objects of this invention are fulfilled by applying the gating pulses to the suppressor grid of a pentode vacuum tube in a manner whereby said tube is rendered conductive for the duration of the gating pulses and inoperative to the interim between gating pulses. Means are provided responsive to the gating pulse for applying a constant bias voltage to the grid of the pentode for the duration of the applied gate. The screen grid of the pentode is partially by-passed to ground, hence when the pentode is rendered conductive by the gating pulse, a feedback voltage is superimposed above the D. C. potential on the screen thereby elevating the screen potential in accordance with a curved pattern.

It may be shown that in a pentode tube, the characteristic is such that for constant values of control grid and plate voltage, with a linear rise in screen voltage, plate current will increase in accordance with a curved pattern. It will then be evident if instead of a linear rise in screen voltage, the rise is made to correspond with the curve taken by plate current in the instance of a linear screen voltage rise, the overall effect is to produce a linear rise in plate current and, in consequence, a linear drop in plate voltage. The non-linear plate voltage drop is balanced out by the non-linear screen voltage rise to produce a linear sawtooth pattern.

For a better understanding of this invention together with other features and further objects thereof, reference is had to the following detailed description to be taken in connection with the accompanying drawing wherein:

Figure 1 is a schematic diagram of one preferred embodiment of a sweep voltage generator in accordance with the invention.

Figures 2A, B, C and D illustrate the wave patterns assumed by varying voltages present at various points in the circuit disclosed in Figure 1 and, Figure 3 shows the effect of screen voltage upon plate voltage in a pentode tube.

Referring now to the drawing and more particularly to Figure 1, a preferred embodiment of the invention is disclosed comprising a rectangular wave gate circuit including triodes 10 and 11, a sweep voltage generator including diode 12 and pentode 13 and an inverter stage including triode 14. Plate voltage for tubes 10 to 14 is furnished by a battery 15.

The rectangular wave generator is of conventional design, the output wave being initiated by a negative triggering pulse 16 applied to input terminals 17. A voltage divider 18, controlling the grid bias of triode 10, is adjusted so that this tube is normally conductive. The application of a negative triggering pulse to the grid of triode 10 renders the tube non-conductive thereby imposing a positive pulse through resistor 19 on the grid of triode 11, rendering same conductive. The resultant IR drop in resistor 20 reduces the voltage on the plate of triode 11, but since the voltage of condenser 21 cannot change instantaneously the grid voltage of triode 10 is lowered by an amount that is initially equal to the reduction of plate voltage on triode 11 and current continues to flow in triode 11. The drop in voltage across resistor 20, however, causes the current to flow into condenser 21 through resistor 22 and thus raise the grid voltage of triode 10. After a time interval that is determined by the magnitude of the time constant of resistor 22 and condenser 21 and to a lesser degree by the values of resistor 20 and the supply voltage, the grid voltage of triode 10 attains the value at which the current again triggers to render triode 11 non-conductive. If the resistor 20 is sufficiently small in comparison with resistor 22 so that the current flow in condenser 21 does not greatly affect the IR drop in resistor 20, the voltage pulse developed across resistor 20 is rectangular in form. The length of this pulse may be controlled by varying resistor 22. Accordingly, for each triggering pulse applied to terminals 17 there is produced a rectangular pulse 23 which is taken off the plate of triode 11.

The rectangular pulses 23 are applied through a coupling capacitor 24 to the suppressor grid of pentode 13. Diode 12, having its plate connected to the suppressor grid and its cathode to ground, serves to maintain the voltage on the suppressor grid at zero level or below, since if the applied gate voltage goes positive, the diode conducts to ground. Thus the voltage applied to the suppressor of pentode 13 assumes the form shown in Figure 2A where it will be seen that the voltage for the duration of the gating pulses is at zero potential, (zero level is indicated by the dashed line) and at a highly negative potential in the interim between gating pulses.

The operation of pentode 13 will now be discussed commencing with the condition existing prior to the application of a gating pulse to the suppressor grid thereof. Since a highly negative bias is now impressed on the suppressor grid, pentode 13 is non-conductive and condenser 25 connected between the plate and grid is fully charged to the plate voltage. When the gating pulse is applied pentode 13 is rendered conductive permitting condenser 25 to discharge therethrough in series with variable resistor 26. The discharge current flowing through resistor 26 develops a voltage drop thereacross which applies a negative bias to the grid as shown by Figure 2B. It will be seen that this bias assumes a definite value for the duration of the gating pulse, the discharge current flow being regulated by the varying impedance of pentode 13.

The screen grid of pentode 13 obtains its potential from a tap position along a voltage divider 27 shunted across the power supply 15. A condenser 28 is connected between the tap on divider 27 and ground, the value of said condenser being such as to partially by-pass the screen grid. As a result, when pentode 13 is rendered conductive by the gating pulse the flow of screen current is such as to cause a rise in screen voltage in accordance with curve shown in Figure 2C. It may then be seen that inasmuch as the control grid voltage for the duration of the gating pulse is constant and the screen grid voltage is variable, the resultant variation in plate current will be a function of screen voltage and, in this case, for reasons to be further explained, will assume a linear sawtooth pattern.

Referring now to Figure 3, the influence of screen voltage upon plate voltage in pentode 13 is illustrated. Since as screen voltage rises the resultant current flow through plate resistor 29 reduces the voltage on the plate of pentode 13, the screen and plate voltages are 180° out of phase. Thus if the screen voltage $E_s$ were to rise in a linear manner, the plate voltage $E_p$ would fall in a curved line in accordance with the characteristic of the pentode. However, since the voltage on the screen rises in accordance with the curve shown in Figure 2C, which curve is substantially identical with the curve taken by plate voltage $E_p$ in the instance of a linear rise in screen voltage $E_p$ in Figure 3, the overall effect is to cause the plate voltage to fall linearly. This condition is indicated in Figure 3 by the dashed lines.

When the tube is rendered non-conductive in the interim between gating pulses, the suppressor grid is again biased beyond cut-off causing the plate voltage on pentode 13 to fall abruptly, thereby completing the sawtooth wave. The voltage on the plate of pentode 13, therefore, assumes the wave pattern shown in Figure 2D, wherein the dashed line represents voltage level prior to the application of the gating pulse.

The negative going sawtooth wave 30 is then applied to the grid of an inverter tube 14 through condenser 31. The voltage on the plate of triode 14, being 180° out of phase with the grid voltage, assumes the form of a positive going sawtooth wave 32 which is applied to the horizontal deflection plates of a cathode ray tube 33 through a coupling capacitor 34. Inasmuch as the sawtooth voltages applied to the grid of inverter tube 14 are of high amplitude, negative feed back is provided by a capacitor 35 connected between grid and plate for the purpose of maintaining linear amplification.

While there has been described what is at present considered a preferred embodiment of the invention, it will be manifest to those skilled in the art that various changes and modifications may be made therein without departing from the invention and it is therefore aimed in the appended claims to cover all such changes and modifications as fall within the spirit and scope of the invention.

What is claimed is:

1. A sawtooth voltage generating circuit comprising an electron discharge device having at least an anode, a cathode, a control grid, a screen grid and a suppressor grid, a source of direct potential connected thru a first impedance to said anode and thru a second impedance to said screen grid, means for applying an input rectangular wave to said suppressor grid to bias said discharge device to cut-off except during the positive portion of said wave including a resistance capacitance coupling circuit and a diode shunting said resistance, means responsive to the conduction of said tube for applying a steady bias to said control grid and means responsive to the conduction of said tube to cause the voltage on said screen grid to vary exponentially thereby causing the current thru said first impedance to increase at a linear rate.

2. A sawtooth voltage generating circuit comprising an electron discharge device having at least an anode, a cathode, a control grid, a screen grid and a suppressor grid, a source of direct potential connected thru an impedance to said anode, a potentiometer connected across said source of potential, the adjustable arm of said potentiometer being connected to said screen grid, means for applying an input rectangular wave to said suppressor grid to bias said discharge device to cut-off except during the positive portion of said wave including a resistance capacitance coupling circuit and a diode shunting said resistance, means responsive to the conduction of said tube for applying a steady bias to said control grid, and means for partially by-passing said screen grid comprising a capacitor connected between said screen grid and one side of said source of potential whereby the screen grid voltage varies exponentially thereby causing the current thru said first impedance to increase at a linear rate.

HERBERT I. ZAGOR.

REFERENCES CITED

The following references are of record in the file of this patent:

UNITED STATES PATENTS

| Number | Name | Date |
|---|---|---|
| 2,172,746 | Young | Sept. 12, 1939 |